June 20, 1967
V. A. MELI ET AL
3,325,889
FILM PACKAGING APPARATUS AND METHOD
Filed May 20, 1965
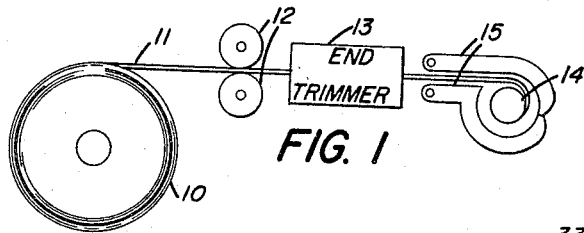
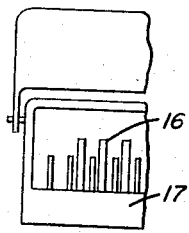
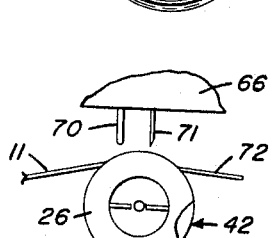
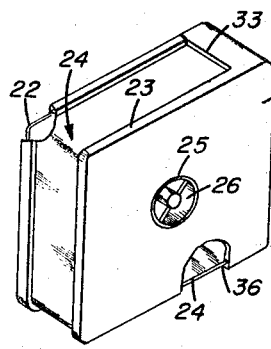
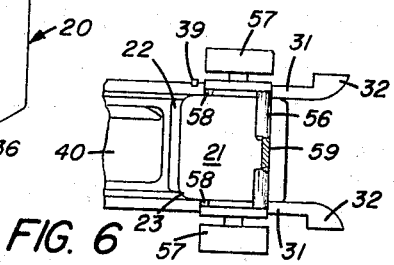
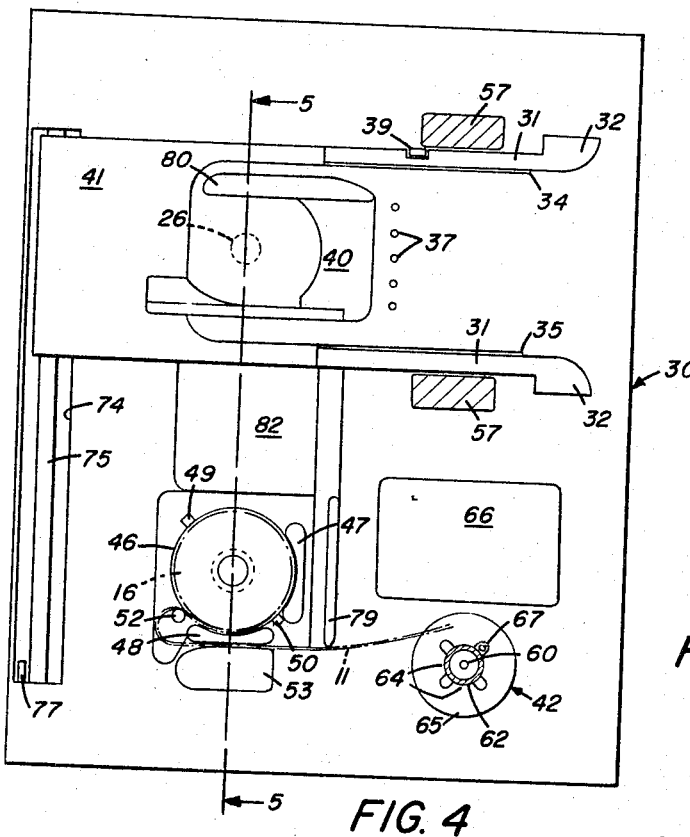
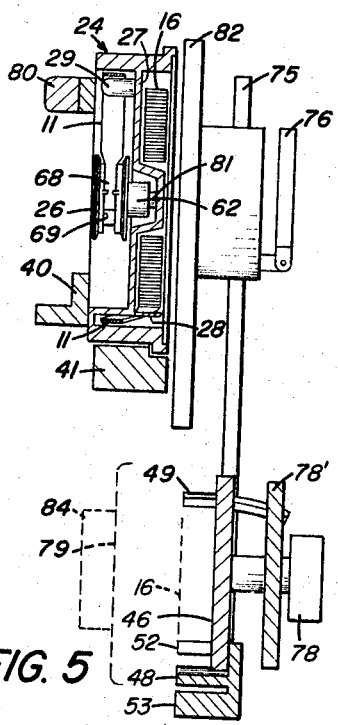
VINCENT A. MELI
JAMES D. MacKAY
INVENTORS
BY R. Frank Smith
David P. Ogden
ATTORNEYS

United States Patent Office 3,325,889
Patented June 20, 1967

3,325,889
FILM PACKAGING APPARATUS AND METHOD
Vincent A. Meli and James D. MacKay, Rochester, N.Y., assignors to Eastman Kodak Company, Rochester, N.Y., a corporation of New Jersey
Filed May 20, 1965, Ser. No. 457,444
14 Claims. (Cl. 29—430)

The present invention relates to a film packaging arrangement and more particularly to an apparatus and method for placing a photographic motion picture film in a cartridge whereby the film may be wound from a coreless roll to a take-up spool by a camera mechanism.

In the art of photographic film packaging, it is well known that the film must be handled in substantial or total darkness so that it will not be exposed prior to being placed in a camera. This situation has caused the development of several machines and methods for handling such film so that it may be packaged without exposure to light. When packaging a photographic film such as a motion picture film within a cartridge that remains closed during picture-taking operations, an acceptable approach in the prior art has been to provide a reversible "double 8" millimeter film cartridge whereby the film is wound first to one take-up spool to expose one-half of the film and then to another to expose the other half. Such a double 8 system requires that the operator reverse the film cartridge when one exposure run is completed. Sometimes the operator does not accurately position the footage indicator so that the film is not reversed soon enough whereby it tends to be pulled from the supply spool or damaged in attempts to pull it beyond the usable region with resulting loss of useful film footage. Also it sometimes occurs that the cartridge is reversed prior to being completely exposed, again resulting in loss of substantial film footage. Moreover, any light leaks in the camera have two opportunities to "fog" the film during the double-exposure sequence.

There has been developed a motion picture cartridge which contains what may be termed a "single 8" mm. film that is driven in only one direction to be completely exposed. A cartridge of this type is discussed in the co-pending U. S. patent application 3,208,686, issued to Evan A. Edwards et al. on Sept. 28, 1965, and assigned to the assignee of the present application. With a "single 8" system, since the film is driven in only one direction, it now becomes feasible to make the cartridge with the film supply roll coaxial with the take-up spool and to make the unexposed film supply wound in a coreless roll having a leader film attached to the take-up spool prior to being packaged. Also the coreless roll has no spool whereby the take-up spool stem may extend at least partially therethrough. Obviously, this arrangement will overcome several of the disadvantages mentioned above. Moreover, in such a cartridge with the coaxial alignment of the coreless roll and a take-up spool, the motion picture cartridge and camera may be made much smaller. However, as will become apparent to those familiar with film handling techniques, such a coaxial alignment of the coreless supply roll and the take-up spool tends to considerably complicate the packaging of the film in complete darkness. The film and take-up spool must be placed on opposite sides of the cartridge body or inner rack without release of any layers of the coreless roll while at the same time threading the film through the drive aperture of the cartridge and over various guide means thereof.

Therefore, an object of the present invention is to provide an improved apparatus for packaging single 8 mm. motion picture film.

A further object of the present invention is to provide an improved method of packaging single 8 mm. film.

In accordance with one embodiment of our invention an empty cartridge is placed on a rail support system having stops at a specific location where the cartridge is opened and the inner body or rack is removed. When the inner rack is in a second position, the unattached take-up spool thereof is released and placed on a staking post where the film leader strip is to be secured thereto. Next a coreless roll of motion picture film which has been previously wound in a tight coil is placed on the overall mechanism with the leader end portion in a staking location on the take-up spool. After staking is completed, the inner support rack of the cartridge is positioned over the coreless roll which is then inserted in one side thereof. Next the spool, having the film leader attached, is placed in its coaxial location with the placing thereof being in such a manner that the leader portion of the film is properly positioned for driving by a camera film drive over various guide mechanisms of the cartridge.

The subject matter which is regarded as my invention is particularly pointed out and distinctly claimed in the concluding portion of this specification. The invention, however, as to its organization and operation, together with further objects and advantages, will best be understood by reference to the following description taken in connection with the accompanying drawing, in which:

FIG. 1 is a simplified block diagram of a coreless roll winding machine;

FIG. 2 is a front elevation view partially cut away of a light-proof transport container for handling the wound coreless rolls;

FIG. 3 is a perspective view partially broken away of a cartridge to be used with the present invention;

FIG. 4 is an elevation view partially broken away of the cartridge loader mechanism;

FIG. 5 is a cross section view taken along the line 5—5 of FIG. 4;

FIG. 6 is a detail view of the cartridge cover holding portion of the loader mechanism shown in FIG. 4; and FIG. 7 is a detail view of the staking mechanism illustrated in FIG. 4.

Referring now to the drawing, wherein like numbers indicate similar parts, we have shown in FIG. 1 a large supply roll 10 of 8 mm. motion picture photographic film 11 driven by transport means 12 through an end trimmer 13 to a wind-up mandrel 14 having conventional film guides 15 therearound. As each film coil is wound on the mandrel 14, the film guides 15 are drawn back and a completed fifty foot coreless film roll 16 is then placed in a light-proof rack type transport container 17, a part of which is shown in FIG. 2. All of this is accomplished in darkness to prevent damage to the film 11.

In FIG. 3 we have shown a perspective view of a cartridge 20 of the type explained in greater detail in the above mentioned patent and having an outer cover 21 which is generally U-shaped and has the bifurcations 22 and 23 thereof covering the exposed surfaces of an inner body portion or rack 24, except for spool access aperture 25 and a film exposure and drive access. A take-up spool 26 is indicated in an exposed central region, aperture 25, of the bifurcation 23. It should be noted that most of the inner rack has slightly smaller overall dimensions than the outer cover portion 23 whereby this outer cover may be engaged by various handling implements without tight engagement of the rack 24. As indicated more clearly in FIG. 5, the rack 24 has a center membrane 27 for positioning the film roll 16 and the take-up spool 26 and various guideways 28 and 29 for conducting the film 11 from the roll 16 to the spool.

Referring now to FIG. 4, the partially cut away elevation view of the front of a loader mechanism 30 is indicated. A pair of rails 31 having flared entrance guides 32 are arranged to receive therebetween the cartridge 20 shown in FIG. 3. The cartridge 20 is inserted until the raised lip portion 33 (FIG. 3) thereof engages a depending portion 34 of the upper rail 31. A similar raised portion 35 of the lower rail engages a similar lip portion 36 of the cartridge cover at the lower side thereof. These stop mechanisms 34 and 35 cause the cartridge to lie in the position, as indicated in FIG. 6, with the bifurcation 22 lying over a plurality of vacuum apertures 37 (FIG. 4) which have vacuum applied thereto to maintain the bifurcation 22 tightly against the back-up plate of the mechanism 30. These vacuum apertures 37 are activated by a switch contactor 39 when the cover 21 is opened as discussed below in connection with FIG. 6.

When the cover 21 is opened, the center body or rack 24 is moved by an operator to lie under a guide plate 40 of a rack support member 41 whereby the take-up spool 26, indicated in phantom in FIG. 4, is accessible to the operator so that it may be moved to the staking post 42 (shown enlarged for clarity). It should be noted that the guide plate 40 extends to a position adjacent to the final location of the cover 21 within the rails 31 so that the take-up spool 26 may not be displaced except near the position indicated in the phantom lines (FIG. 4).

Below the rack support member 41 is a coreless roll support member 46 having thereby guide surfaces 47 and 48 and retainer bars 49 and 50. The retainer bar 50 has thereon a latch cam arrangement to prevent outer layers of the coreless roll 16 (in phantom) from slipping from the support 46. Both of the retainer bars 49 and 50 are spring biased to maintain a roll 16 therebetween. As indicated in phantom lines (in FIG. 4), the film 11 is pulled from the coreless roll 16, looped over a guide post 52 and moved between the guide 48 and a guide 53 to the staking post 42 where it is secured to the take-up spool as discussed below. The post 52 and the guide blocks 47, 48 and 53 are all positioned so that the film roll 16 may be inserted into one side of the rack 24 with the leader in guideway 28 thereof. Obviously such threading is requisite if an operable cartridge is to be loaded in the dark.

Referring now to FIG. 6, a cam member 56 is positioned over the rails 31 and supported in a pair of spring biasing posts 57. A pair of rollers 58 of the cam member 56 lie under the bifurcation 23 when the cartridge 20 is inserted between the rails 31. The spring loading of the cartridge cam 56 makes it stable with the rollers in a cartridge open or closed position. To open the cartridge, the bifurcations 22 and 23 are spread by moving the cam 56 from the closed to the open position shown in FIG. 6. Rotation of the cam member 56 raises the rollers 58 to raise the bifurcation 23 with the bifurcation 22 remaining below the stop members 34 and 35 and over the vacuum ports 37. At the same time, one of the rollers 58 releases the vacuum actuator 39 whereby the bifurcation 22 is secured tightly and the rack 24 may be easily withdrawn. A foot portion 59 of the cam 56 also engages the cover 21 to further secure and compress it to assure its remaining open in the position indicated.

Referring again to FIG. 4, the staking post 42 is illustrated in detail and has a central guide and support post 60 over which a stem of the core 26 is positioned. The stem, as indicated in section at 62, is engaged by a plurality of fingers 64 of a resilient member 65. This engagement maintains the core 26 in position much like a cork in a resilient bottle, with the support post 60 providing staking support. The thickness of the resilient member 65 controls the ultimate alignment of the take-up spool so that the staking tool 66 will properly stake the leader of the film 11 thereon. The staking post 42 also contains an actuator contactor 67 which is energized when the spool 26 is on the post 42. The contactor 67 provides signal information to release the rack holder 41 and to allow operation of the staking tool 66, as by a switch under the control of the operator. We prefer to have the staking tool 66 powered as by a solenoid to provide uniform staking of each spool 26.

As shown more clearly in FIG. 7, the spool 26 is positioned on the staking post 42 with the film 11 thereon in preparation to be secured thereto. As explained in greater detail in the co-pending U.S. patent application Ser. No. 434,927, filed Feb. 24, 1965, by Tucker et al. and assigned to the assignee of the present application, when staking is used to secure the spool, the film is trimmed by the trimmer 13 to have a narrow portion 68 (FIG. 5) lie within a narrow trough 69 of the spool 26. When the spool 26 is properly positioned and the necked-down portion 68 is pulled (FIG. 7) into this trough, the operator actuates the staking tool 66 whereby a staker 70 and a cut-off tool 71 secure the leader portion of the film 11 to the spool and cut off an excess tab portion 72 of the film used to insert the necked-down section in the trough. The staking operation itself is discussed in more detail in the co-pending Tucker et al. patent application.

After the spool 26 is secured to the film 11 by the staking tool 66, or by other means such as a paster described in the prior art, the guide plate 40 and the rack support 41 are lowered in a slot 74 and on a support shaft 75 to be positioned in front of the roll support member 46. We prefer to have this lowering accomplished pneumatically as by a piston 76 (FIG. 5) in response to a foot pedal actuated by the operator. When in this position, another release contactor 77 (FIG. 4) is energized so that the roll support member 46 may be moved forward. At the same time the roll support 46 moves out, in response to actuation of a drive means such as an air cylinder 78, the retainer bars 49 and 50 are spread by tapered or camming engagement of a drive plate 78' to allow release of the coreless roll without damage to the outer layer of film thereon. Next, the spool 26 is carried over the guide surface 79 (fixed as shown in FIG. 4 with the elevation thereof indicated in FIG. 5 in phantom) and under the guide plate 40. As the film leader is positioned in the slot over the guide 29, it is guided by the surface 80 (on part 40). Thus the spool is positioned with its stem 62 extending partially through the center of the coreless film roll 16 on a tapered guide pin 81 of the cartridge 20 with the film leader in the cartridge guide paths. Next the rack support 41 is raised over a platform 82 by release of the pneumatic switch whereby the piston 76 returns to the position indicated in FIG. 5. The platform 82 extends forward enough relative to the retracted position of the roll support 46 (see FIG. 5), to maintain the coreless roll 16 in the rack 24 during the upward movement of the rack support 41. When again in the upper position the rack 24 is pushed to the right (FIG. 4) and into the cover member 21 whereupon the cam 56 is moved to the cartridge closed position and the loaded cartridge 20 may be removed. Also in FIG. 5 we have shown in phantom the relative location of the cover's film exposure and drive access region 84 which is aligned with the film path because of the guides 40 and 79.

It is readily apparent from the above description that the method of loading the cartridge 20 includes preparing a coreless film roll 16 and placing it on the roll support member 46, placing an empty cartridge between the guide rails 31, moving the body or rack portion 24 to the rack support 41, removing the spool and placing it in the staking location 42, taking the leader of the film 11 and placing it over the spool 26, pulling the necked-down film portion 68 into the spool trough 69, staking the leader to the spool, lowering the rack 24 to be in front of the coreless roll 16, placing the coreless roll in one side of the rack membrane 27, threading the film leader and placing the spool in the other side of the rack membrane 27 and returning the loaded rack 24 to the cartridge cover 21.

While we have shown a particular embodiment of this invention, modifications thereof will occur to those skilled in this art. We intend therefore to have the appended claims cover such embodiments as properly fall within the scope of the present invention.

We claim:

1. A film packaging apparatus for placing a coreless film roll and an attached take-up spool in a cartridge having a spool drive access and a film exposure and drive access and having an internal rack for receiving the roll and spool and formed with film guide means defining a film path between the roll and the spool including a portion passing under the film exposure and drive access, comprising:

means for spreading the cartridge at a predetermined location to facilitate release of the internal rack therefrom;
means for receiving and supporting the released rack;
first guide means for limiting release of a take-up spool from within the rack, said guide means extending from said rack support means to the predetermined location;
a coreless film roll holding means;
means for staking the film leader to the spool;
second guide means between said roll holding means and said staking means forming a path for threading a film leader from the coreless roll to the spool with the path corresponding to a portion of the path the film will follow in the cartridge;
means for moving said rack support to a position aligned with the coreless roll;
means for inserting the roll in the rack;
guide surfaces for guiding the film through a tortuous path whereby positioning of the spool coaxial with the coreless roll in the rack may be accomplished while threading the leader through a tortuous path corresponding to the remainder of the film leader path in the rack; and
means for guiding the rack to alignment with the open cover whereby the loaded rack may be reinserted without loss of the spool and the cover may be released to complete the loading of film therein.

2. A photographic film packaging apparatus for placing a coreless film roll and an attached take-up spool in a cartridge within a dark environment, comprising:

guide means for limiting the motion of a filmless cartridge at a specific location;
means at said location for manipulating the cover of the cartridge to facilitate removal of an internal rack and take-up spool;
second guide means for receiving the rack;
third guide means for preventing removal of the spool until the rack is in the second guide means;
means for supporting the coreless film roll;
a staking post for receiving the spool;
film guide means to facilitate forming a loop in a leader portion of the film roll prior to staking the leader portion to the spool;
fourth means for guiding said second guide means to a position so that the film roll and loop may be inserted in one side of the rack; and
another film guide means for facilitating threading the leader portion along a tortuous path corresponding to that in the rack during placing of the spool in the other side thereof.

3. A photographic film packaging apparatus operable in a dark environment for placing a coreless film roll and an attached take-up spool in a cartridge including an internal rack and a take-up spool, comprising:

first means for holding a filmless cartridge at a specific location;
second means at said location for manipulating the cover of the cartridge to allow removal of the internal rack and take-up spool;
third means for receiving the rack;
fourth means for supporting the coreless film roll;
a film attachment station for receiving the spool;
film guide means facilitating the formation of a loop of film within a leader portion thereof extending from the roll to the spool;
fifth means for securing the leader portion to the spool;
sixth means for guiding said third means to a position aligned with said fourth means and for inserting the film roll and loop in one side of the rack; and
another film guide means for facilitating threading the leader in a tortuous path corresponding to a path in the rack during placing of the spool in the other side thereof.

4. A film packaging apparatus as in claim 3, interlock means sensitive to the positioning of the spool at said film attachment station for allowing movement of said third means to alignment with said fourth means only when a spool is in place.

5. A film packaging apparatus as in claim 3 having interlock means sensitive to the positioning of the spool at said film attachment station for allowing operation of said fifth means only when a spool is in place.

6. A photographic film packaging apparatus operable in a dark environment for placing a film roll on one side of a cartridge rack and attaching to a leader of the roll a take-up spool and placing it in the other side of the rack with the connected film therebetween being in a path through which it may be advanced during picture taking operations, comprising:

a coreless film roll holding means;
film guide means associated with said roll holding means and corresponding to a portion of a film path of the rack between the roll and the spool;
a spool holding means spaced from said roll holding means so that film threaded through said guide means may extend thereto when the leader portion of the film is attached to the spool;
means for guiding the rack to a position receptive of the coreless roll and the threaded film leader; and
other guide means for facilitating completing the film threading within the cartridge rack while placing the attached spool coaxially with the roll in the rack.

7. A film packaging apparatus for placing a coreless film roll and an attached take-up spool in a cartridge having a spool drive access and a film exposure and drive access with a path between the roll and the spool including the film drive access, comprising:

means for manipulating the cartridge cover to allow release of an inner rack therefrom;
means for receiving and supporting the released rack;
means for holding coreless film roll and a spool;
guide means between said roll and spool holding means for facilitating threading a film leader from the coreless roll to the spool in a path corresponding to a portion of the path the film will follow in the cartridge;
means for securing the leader to the spool;
means for guiding said rack support means to a position aligned with the coreless roll;
means for inserting the coreless roll in one side of the rack;
guide surfaces for guiding the film through a tortuous path whereby positioning of the spool coaxial with the coreless roll in the rack may be accomplished while threading the leader through a tortuous path corresponding to the remainder of the film path between the roll and the spool, said guide surfaces assuring that the film lies in a region corresponding to the film exposure and drive access; and
means for guiding the rack to alignment with the open cover whereby the loaded rack may be reinserted and the cover may be released to complete the loading of film therein.

8. A method of packaging photographic roll film comprising the steps of:

winding a length of film into a coreless roll;
attaching an outer portion of the rolled film to a take-up spool to couple a leader film between the coreless roll and the spool;

placing the coreless roll in one side of a cartridge rack having coaxial adjacent support regions for holding the coreless roll and the spool;

placing the spool in the other side of the rack coaxial with the roll; and placing the rack with film and spool thereon in a cover providing protection to the support regions and access for driving the film from the coil to the spool.

9. A method of packaging film as defined in claim 8 having the step of threading the film coupled between the coreless roll and the spool across a forward portion of the rack to lie within an access region of the cover so that it may be driven to the spool.

10. A method of loading a film cartridge having an inner rack defining a film path, including the steps of:

opening the cartridge cover;

placing a coreless film roll in a support system including guide means corresponding to a portion of the film path of the cartridge;

threading a leader of the film on said guide means;

securing a take-up spool to the leader;

inserting the roll and threaded leader in one side of the rack;

placing the attached spool in the other side of the rack;

threading the leader through a remainder of the film path of the cartridge; and inserting the rack with roll and spool therein in the open cover.

11. The method of loading the film cartridge according to the method of claim 10 and wherein the unloaded film cartridge contains an unloaded rack and an unattached take-up spool therein, including the steps of;

removing the unloaded rack and the unattached take-up spool from the cartridge; and removing the spool from the rack and placing it in line with the coreless roll leader prior to the securing step.

12. An apparatus for packaging a coreless film roll and a take-up spool, which is attached to a leader of the film roll, in a cartridge incorporating a cover and an internal rack defining a first chamber on one side for receiving the film roll, a second chamber on the other side for receiving the spool coaxially with the roll and a film guide path between the chambers, said apparatus comprising:

means for guiding the coreless film roll into the first chamber of the rack and one section of the film leader into a portion of the guide path thereof; and guide means for positioning another section of the film leader to facilitate insertion thereof within the remaining portion of the rack guide path while placing the take-up spool in the second chamber coaxial with the roll.

13. The invention of claim 12 and further comprising:

means for guiding the rack with the film roll and spool thereon to the cover of the cartridge; and means for manipulating the cover to enclose the film containing rack.

14. The invention of claim 12 and further comprising:

means for manipulating the cover to facilitate separation of the rack from the cover of a filmless cartridge.

References Cited
UNITED STATES PATENTS

| | | | |
|---|---|---|---|
| 2,776,094 | 1/1957 | Edwards | 242—55.11 |
| 2,924,921 | 2/1960 | Wallace | 53—54 |
| 2,940,232 | 6/1960 | Wallace et al. | 53—54 X |
| 3,208,686 | 9/1965 | Edwards et al. | 242—71.2 |
| 3,226,816 | 1/1966 | Wilson et al. | 29—430 |

JOHN F. CAMPBELL, *Primary Examiner.*

THOMAS H. EAGER, *Examiner.*